Feb. 14, 1967 N. G. MUSKOVAC 3,304,438

PHASE SHIFT GATE DRIVE CIRCUIT

Filed Nov. 19, 1963 4 Sheets-Sheet 1

INVENTOR
Nicholas G. Muskovac

BY Connolly and Hutz
ATTORNEYS

Feb. 14, 1967 N. G. MUSKOVAC 3,304,438

PHASE SHIFT GATE DRIVE CIRCUIT

Filed Nov. 19, 1963 4 Sheets-Sheet 2

INVENTOR

Nicholas G. Muskovac

BY Connolly and Hutz

ATTORNEYS

Feb. 14, 1967 N. G. MUSKOVAC 3,304,438

PHASE SHIFT GATE DRIVE CIRCUIT

Filed Nov. 19, 1963 4 Sheets-Sheet 3

INVENTOR
Nicholas G. Muskovac

BY Connolly and Hutz
ATTORNEYS

INVENTOR
Nicholas G. Muskovac
BY Connolly and Hutz
ATTORNEYS

United States Patent Office 3,304,438
Patented Feb. 14, 1967

3,304,438
PHASE SHIFT GATE DRIVE CIRCUIT

Nicholas G. Muskovac, Stamford, Conn., assignor to Sprague Electric Company, North Adams, Mass., a corporation of Massachusetts Filed Nov. 19, 1963, Ser. No. 324,626
2 Claims. (Cl. 307—88.5)

This invention relates to phase shift circuits containing a variable resistance and a capacitance so as to be capable of shifting the phase of the output voltage relative to the input voltage while maintaining the output voltage at a substantially constant magnitude. More particularly this invention relates to a phase shift network in which the capacitance is kept constant and the resistance element is a transistor.

A phase shift circuit capable of providing a wide angle phase shift while maintaining a reasonably constant magnitude of output voltage is provided by a network which has a first branch circuit and a second branch circuit energized from an alternating current source. The alternating current source has terminals to which the branch circuits are connected. A first output terminal is established at the juncture of a first and a second impedance element. A second branch circuit includes third and fourth impedance elements which are serially connected. A second output terminal is connected between the third and fourth impedance elements.

The purpose of the phase shift network is to vary the phase between the output voltage and the input voltage so that one either leads or lags behind the other. One use of such a phase shifting network is to provide the gate firing voltage for a silicon controlled rectifier, hereafter referred to as SCR. Phase shifting networks are used to vary the time of application of the firing signal to a silicon controlled rectifier. To assist this control of the SCR firing time it is desirable to provide a variable resistance element which can in effect be varied in range from infinity to zero so that the shift of the phase angle can be effected through a full 180°.

Line voltage supplying the power for phase shifting may be subject to a variation in potential. It is desirable to be able to compensate for this change in line voltage. This is particularly important for the period during which the SCR is conducting.

The third and fourth impedance elements may be a capacitor and the variable resistance element serially connected. The second output terminal is connected between the capacitance and the variable resistance element. It is desirable to have the variable resistance element controllable by means of a D.C. current signal.

It is an object of this invention to provide a controlled simplified phase shifting network for an SCR.

It is another object of this invention to provide a phase shift network for control of a silicon controlled rectifier having a resistance element with an effective resistance of from infinity to zero as nearly as possible.

It is still another object of this invention to provide a control for a silicon controlled rectifier which compensates for line voltage changes while maintaining a constant current.

These and other objects of this invention will become more apparent upon consideration of the following description taken together with the drawing in which.

In general, this invention provides an R–C phase shifting network in which the resistance is made up of a transistor, and the capacitance is kept constant. The output from this phase shifting network is connected to the gate of a silicon controlled rectifier so that the output of the phase shifting network may vary the time of the application of the firing signal to the silicon controlled rectifier. The collector circuit of the transistor is supplied from the same phase as the SCR anode supply source so as to suppress the gate pulse when the SCR anode is negative.

Figure 1:
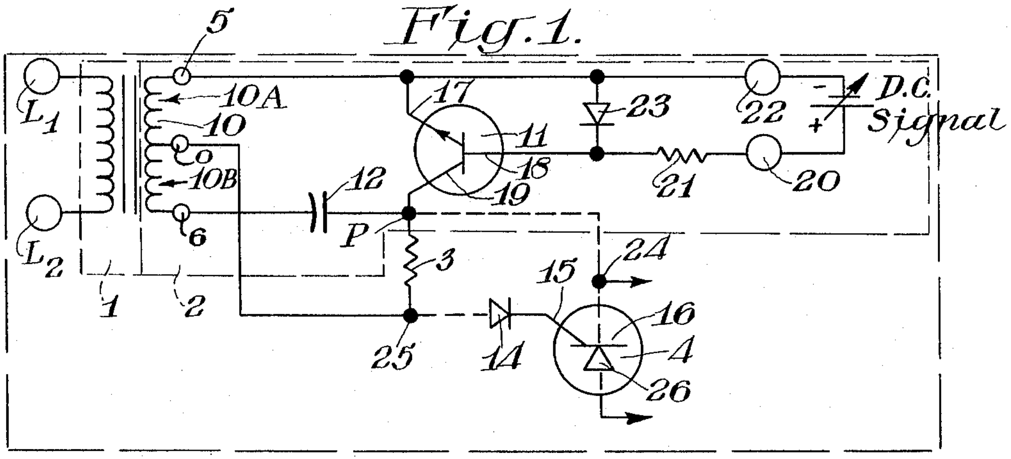
FIGURE 1 is a schematic diagram of a silicon controlled rectifier firing circuit according to this invention.

FIGURE 1 illustrates one form of the invention, comprising transformer and power supply unit 1, phase shifting network 2, load resistance 3, SCR 4 supplied from A.C. input terminals L1 and L2 and having a load connected in series with its anode.

The phase shifting network is supplied with A.C. from a center tapped secondary winding 10 of transformer 1.

Figure 2:
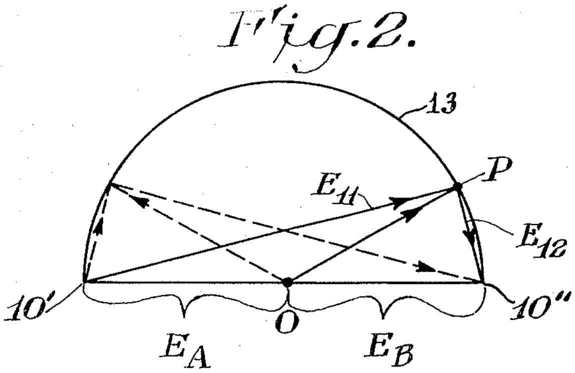
FIGURE 2 is a voltage vector diagram depicting voltage vectors obtained in the phase shifting network of FIGURE 1.

FIGURE 2 is vector diagram showing the relationships of voltages of the phase shifting network 2.

The variable element is a transistor 11 which is connected serially with a fixed capacitor 12 and a juncture which is also common with an output terminal P between the transistor 11 and the capacitor 12. The other output terminal O is the center tap of the secondary winding 10. The two parts of the secondary winding on each side of the output terminal O provide the first and second impedances 10A and 10B in the phase shifting network 2.

The voltage vector diagram shown in FIGURE 2 depicts the voltage vectors obtainable from the circuit of FIGURE 1 wherein the vector 10′–10″ represents the fixed base line vector as established by the alternating current source 5, 6. The impedance elements 10A and 10B are represented by the vectors $E_A$ and $E_B$. The juncture of the elements 10A and 10B establishes the potential at the output terminal O, which is midway between the ends of the vector 10′–10″. The transistor 11 and fixed capacitor 12 respectively are represented by voltage vector $E_{11}$ and $E_{12}$. The terminal P is represented by an arcuate locus.

The phase shifting network is made up of a first and second impedance 10A and 10B in a first branch circuit, a transistor 11 and capacitor 12 in a second branch circuit and terminals O and P with respective leads. The phase shifting network is energized from the alternating current source of supply unit 1. The transistor is variable, that is, it is relatively variable in impedance. When the resistance of the transistor is varied and the capacitor 12 is kept constant, the point P on the voltage vector diagram of FIGURE 2 will describe an arcuate locus 13 having the base line 10′–10″ as a chord of this arc. The chord is in fact the diameter of the semicircle locus 13.

The output terminal O is connected through the diode 14 to the gate 15 of the silicon controlled rectifier 4 (herein referred to as SCR). The output terminal P of phase shifting network 2 is connected to the cathode 16 of the SCR. Accordingly, a positive current is suppied to the SCR gate 15 from the terminal.

In FIGURE 1, the variable element is the transistor 11. The transistor 11 has an emitter 17, a base 18 and a collector 19. The emitter 17 is connected to inductance 10A, and the collector 19 is connected to capacitor 12. The capacitor 12 is connected to the inductance 10B at the opposite end of the secondary winding 10. This completes the phase shifting network. The center tap of the secondary winding 10 is between the inductance 10A and the inductance 10B. This center tap is output terminal O.

A transistor P–N junction such as the base 18 to collector 19 relation of transistor 11 acts to pass current from the P-layer to the N-layer only and has a high resistance path from the N-layer to the P-layer. The transistor can be made to vary its conductance by applying a direct current signal to its base 18, and the resistance of the transistor is accordingly varied. Reducing the resistance of the transistor advances the phase angle of the A.C. output voltage between terminals O and P of the phase shifting network 2. The reference voltage is established across the first branch circuit of inductance 10A and 10B. The other branch circuit is established across the transistor and the phase capacitor connected across the fixed branch circuit. The output voltage is variable in phase but not materially in magnitude with the variable resistance of the transistor 11.

The positive current is delivered to the gate 15 whenever a suitable positive current is supplied from the transistor 11.

A direct signal is supplied to the base 18 from a D.C. signal terminal 20 through a current limiting resistor 21. The means for supply of a variable D.C. signal is connected to the terminal 20 and a terminal 22 connected to the inductance element 10A. A diode 23 protects the transistor base 18 from the A.C. supply.

Thus a signal triggered by the D.C. signal supply through terminals 20, 22 to the base 18 reduces the resistance of the transistor 11 and thus advances the phase angle of the A.C. output voltage between terminals O and P. The transistor provides a phase shift of about 170° to 175°. This moves the point P around the arcuate locus based on the chord 10′–10″. The output terminal P of the phase shift network 2 is connected to the terminal 24 and through a terminal 24 to the cathode 16 of the SCR 4. The output terminal O of the phase shifting network is connected through a terminal 25 to the diode 14 and through the diode 14 to the gate 15 of the SCR. The transistor 11 will deliver a positive current from its emitter 17 to the SCR gate 15 whenever a suitable current is supplied to the transistor base 18; this occurs during substantially each entire positive half-cycle of the phase shifting output voltage OP.

The SCR anode 26 is connected to its load and thence through the load to the A.C. input terminal L2.

A circuit construction in accordance with FIGURE 1 exhibits a pulse having a start at a phase angle with the A.C. input voltage which can vary from an almost 180° lag to an angle substantially equal to that of the input voltage by passing a few microamperes of D.C. current through the transistor 11.

Figure 3:
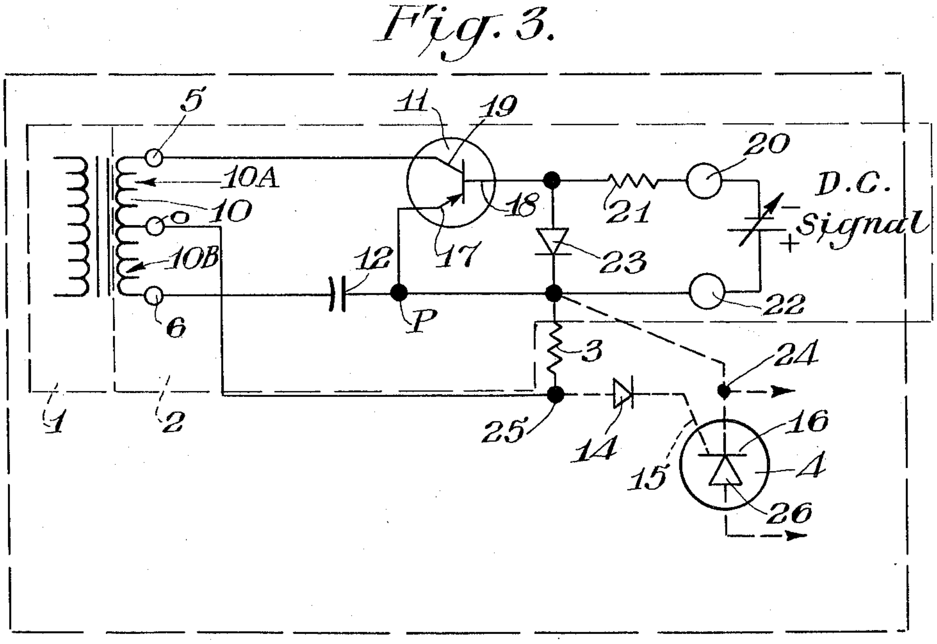
FIGURE 3 is a schematic diagram of another embodiment of the control circuit of this invention.

FIGURE 3 shows another embodiment of the invention, in which several of the elements are similar to those of FIGURE 1, and such elements will be similarly numbered.

The phase shifting network 2 has the same general configuration as FIGURE 1 and with particular reference to the vector diagram 2 herein. The center tap O is provided by the serially connected inductances 10A and B across the A.C., not by terminals 5 and 6. Transistor 11 and capacitor 12 correspond to those of FIGURE 1.

In FIGURE 3 the transistor is a P-N-P transistor having an emitter lead 17, a base 18 and a collector 19. The diode 23 is connected with the cathode common with the output terminal P and the anode connected to the base 18. The D.C. signal terminals 20 and 22 are connected with the current limiting resistor 21 between the diode 23 anode and the terminal 20. The forward direction of the P-N junctions connected in series is collector 19 to base 18 and through the diode 23. It is through these series P-N junctions that capacitor 12 is charged on every half cycle. The conductance of the transistor is varied by the D.C. signal across terminals 20 and 22 with the base 18 negative to the emitter 17. The voltage diagram vectors of FIGURE 2 apply equally to the embodiment shown in FIGURE 3.

Figure 4:
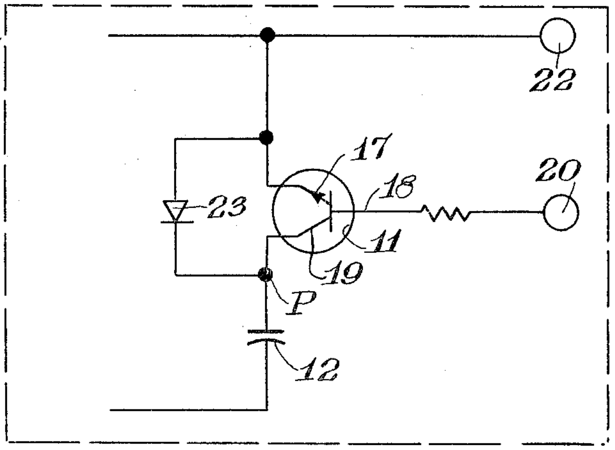
FIGURE 4 is a diagram illustrating an alternative connection for the protective diode and charging diode for capacitor 12 of FIGURE 3.

FIGURE 4 illustrates an alternative arrangement of diode 23 of FIGURE 1. The transistor 11 is arranged with the emitter 17 connected to the inductance 10A and the anode of the diode 23. The cathode of the diode 23 is connected to the collector 19 which in turn is connected to the common point and output terminal P. The capacitor 12 is now kept charged by the current passing through diode 23 only. The capacitor 12 is discharged every half-cycle of supply line frequency whenever a direct current voltage is applied to terminals 20 and 22 and the transistor 11 is made to conduct.

Figure 5:
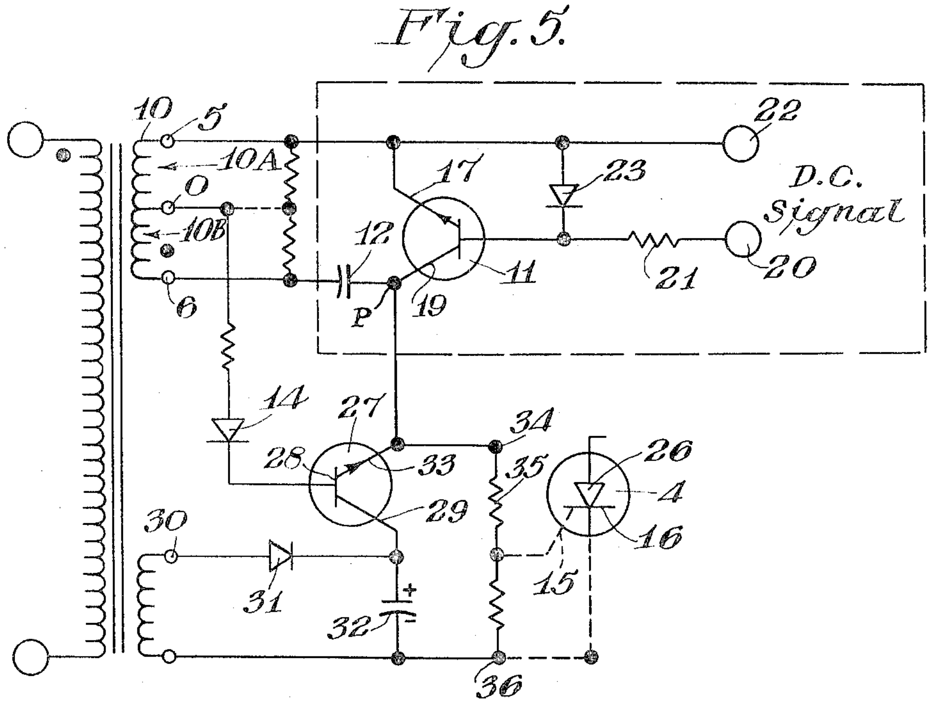
FIGURE 5 is a schematic diagram of still another embodiment of the control circuit of this invention.

FIGURE 5 illustrates another modification of the embodiment of FIGURE 1. This embodiment provides an amplified output of the basic R-C phase shifting network and produces a high current square wave pulse particularly suitable for firing large SCR's. In the embodiment of FIGURE 5 a transistor 27 is added between the phase shifting network and the SCR. The transistor 27 has a base 28 which is connected to the output terminal O of the basic phase shift network through the diode 14. Rectified and filtered D.C. voltage is provided to transistor 27 at its collector 29 from a secondary transformer 30 through a diode 31 and fixed capacitor 32. The output terminal P of the phase shifting network 2 is connected to the transistor 27 at its emitter 33.

The collector current is returned through the emitter 33, an output terminal 34, the current limiting resistor 35, the SCR gate 15, the SCR cathode 16 and another output terminal 36 to the transformer secondary 30. The voltage vectors obtainable from the circuit of FIGURE 5 are of the same nature as the vectors of embodiments of FIGURES 1 and 3 described above.

Figure 6:
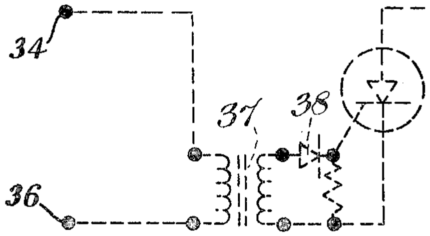
FIGURE 6 is a diagram showing a modification of the output circuit of the embodiment of FIGURE 5.

FIGURE 6 depicts a modification of the output circuit of the FIGURE 5 embodiment which provides isolation between the D.C. voltage to the transistor 27 and the gate 15 and cathode 16 of the SCR 4. In this modified embodiment of the output a transformer 37 is attached to the terminals 34 and 36. A diode 38 between the transformer 37 and the gate 15 prevents any negative voltage from appearing at the gate 15. The transformer 37 is selected for its ability to pass the fast rise time leading edge of the excited pulse. Further for maximum efficiency the transformer 37 should be able to pass a square wave equal to the basic excitation frequency of the circuit.

The principle of this invention may also be incorporated in a circuit in which a pair of SCR's are controlled by two transistors. The phase shift control means of this invention is employed and the two transistors provide full wave control to a pair of SCR's.

Figure 7:
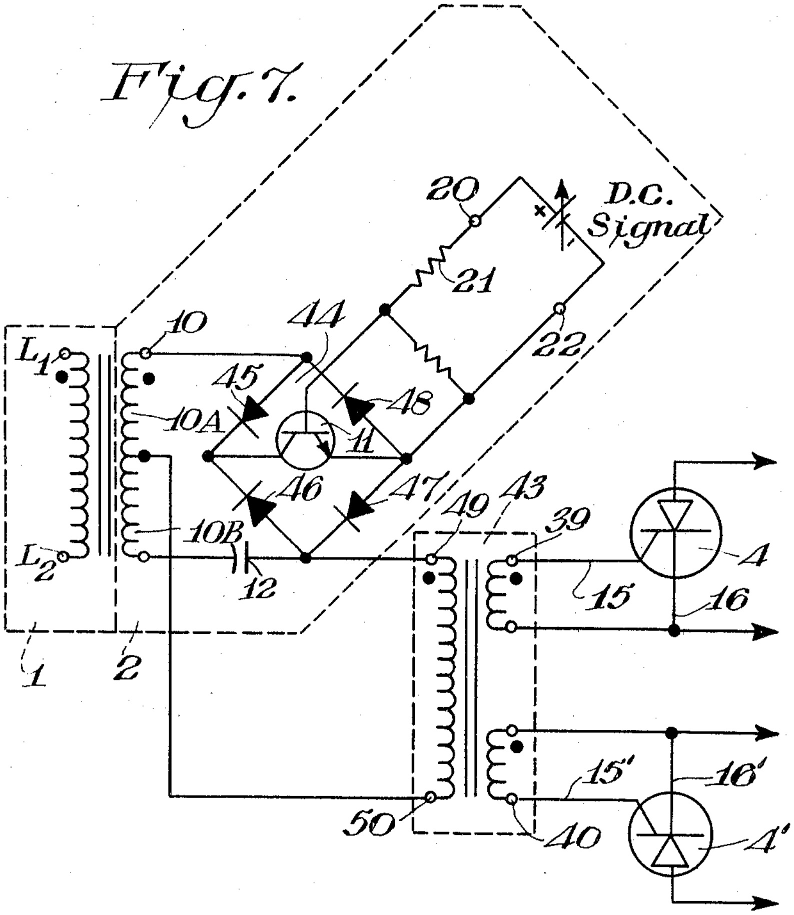
FIGURE 7 is a schematic diagram according to this invention for full wave control.

FIGURE 7 illustrates a system embodying full wave control for a pair of SCR's. A transformer and power supply unit 1 and a phase shifting network 2 are analogous to similar components in FIGURES 1, 3 and 5. A pair of SCR's 4 and 4′ are analogous to the SCR 4 of FIGURES 1, 3 and 5. A.C. input terminals L1, L2 provide the power. The control is provided at a pair of gate terminals 39 and 40. Cathode terminals 41 and 42 are connected to the SCR cathodes. The transformer 43 is analogous to the transformer 37 of FIGURE 6. The control pulse from the phase shifting means 2 is provided from the transformer 43 applying pulses on the respective gate terminals 39 and 40 alternately. The anode voltage for the SCR's 4 and 4′ is suitably supplied from a common source.

The output from the phase shift network is thus alternately connected to the respective gates of the SCR's 4 and 4′ so that the output of the phase shift network may vary the time of application of the firing signal to the SCR's alternately.

The alternating output of the phase shifting network which is applied to the transformer 43 is the product of the phase shifting network 2 of FIGURE 7 which is comprised of an NPN transistor 11 analogous to the transistor of FIGURES 1, 3–5 above together with a bridge 44 made up of diodes 45, 46, 47 and 48. The phase shifting network 2 is supplied with A.C. from the secondary winding 10 of transformer 1. As in the circuit of FIGURE 1 the variable element in the phase shift network 2 is the transistor 11. A fixed capacitor 12 is connected to the inductance 10B at the opposite end of the secondary winding 10 from inductance 10A to which the transistor 11 is connected. The transistor 11 and the bridge 44 are able to pass an alternating current. Therefore, the transistor 11 is a variable A.C. resistance in which the resistance may be varied by applying D.C. signal to terminals 20 and 22 similar to the operation described above in connection with FIGURES 1 and 3.

The phase shifting network has two branches and one branch has a leg provided by the transistor 11 and the bridge 44. This is the variable leg. The other leg of this branch of the phase shifting network is provided by the capacitor 12 which is serially connected with the bridge. The output P is at a juncture common between the capacitor 12 and the bridge 44. The other output terminal O is at the center tap of the secondary winding 10. The two legs of the other branch of the phase shifting network are sections 10A and 10B of the secondary winding. The voltage vector diagram of FIGURE 2 applies to the voltage vectors obtainable from the circuit of FIGURE 7 in the same manner as it applies to the voltage vectors obtainable from the circuit of FIGURE 1 except that the ability to pass alternating current provides a full wave control from the phase shifting network. The phase shifting network output terminal P is connected to terminal 49 of the primary of transformer 43. The phase shifting network output terminal O is connected to the terminal 50 of the transformer primary. The secondary windings of transformer 43 are phased 180° apart and provide gate pulses alternately to the respective gate terminals 39 and 40. Thus, through the transformer 43 the output of the phase shifting network provides alternate pulses to the two SCR's 4 and 4′ in a full wave control.

The two outputs which are phased 180° apart can be amplified by the addition of transistors in the means illustrated by the embodiment of FIGURE 5. A high current output is then provided which is particularly suitable for firing large SCR's.

Figure 8:
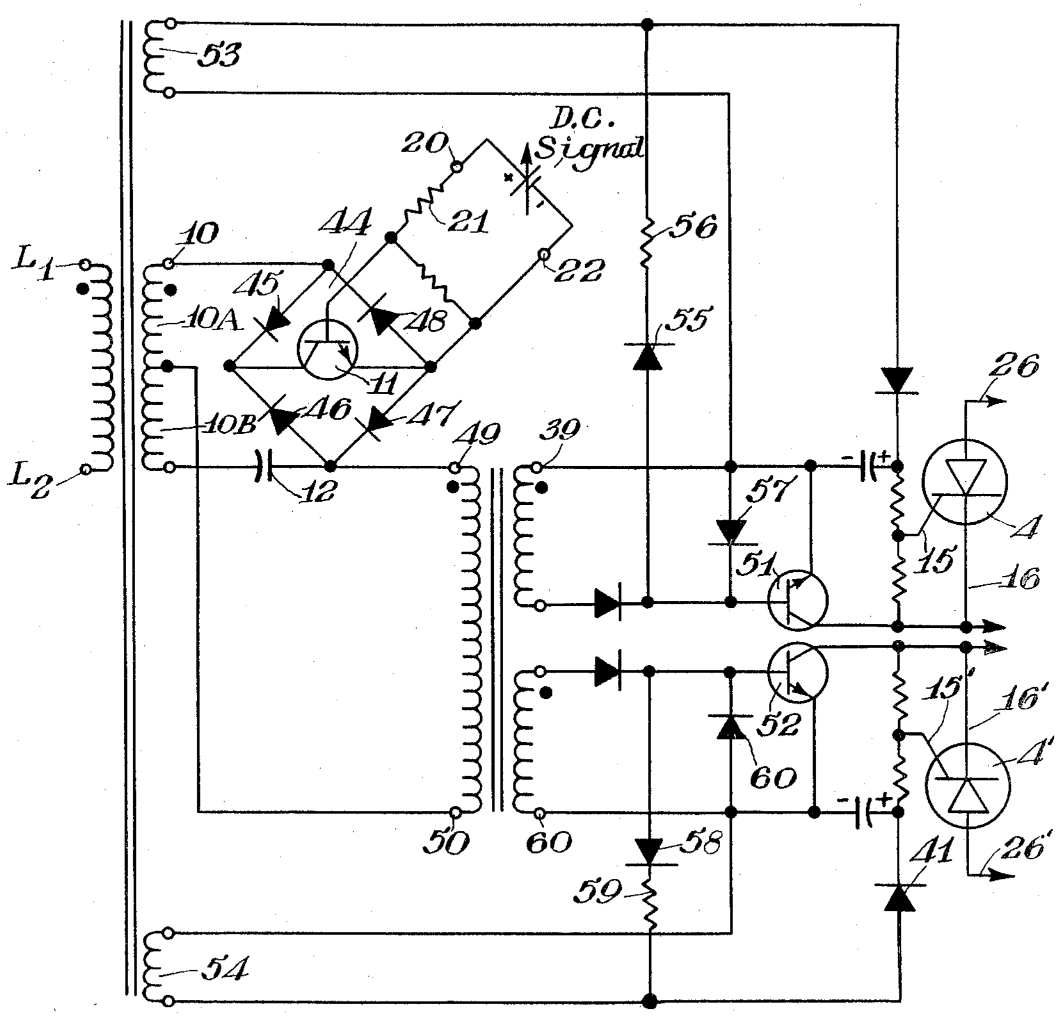
FIGURE 8 is a modification of the control system of FIGURE 7.

FIGURE 8 illustrates a circuit with a further modification biased upon the full wave control system shown in FIGURE 7. In FIGURE 8 a pair of current limiting resistors and blocking diodes provide a potential from a secondary winding on the power supply transformer which controls the transistor current of a pair of transistors through which the control pulse is applied to the SCR's 4 and 4′.

In FIGURE 8 the firing of first one and then the other of the two SCR's 4 and 4′ which are connected in inverse parallel in the A.C. line is controlled by a transistor 51 for SCR 4 and a transistor 52 SCR 4′. Transistors 51 and 52 of FIGURE 8 operate in the alternate phases of the A.C. power. The emitter of each of the transistors 51 and 52 is connected to the respective gates 15, 15′. Similarly, the respective collectors of the transistors 51 and 52 are connected to the respective cathodes 16 and 16′. A pair of secondaries 53 and 54 are connected between the emitter and base of the respective transistors 51 and 52. The emitter of 51 is connected to the base of 51 through a diode 55 and a current limiting resistor 56 and a diode 57. Similarly, the emitter of transistor 52 is connected to the base of transistor 52 through a diode 58, a current limiting resistor 59 and a diode 60. Accordingly, the base of each transistor 51 and 52 is driven positive during alternate half cycles while the diodes 55, 57, 58 and 60 prevent the base from being driven negative. The diodes 55 and 57 and the resistor 56 comprise a clamping network for cutting off transistor 51 when the anode 26 is negative. Similarly, the diodes 58 and 60 and the current limiting resistor 59 comprise a clamping network which cuts off transistor 52 whenever the anode 26′ is negative.

The phase shifting network of this invention provides a varying resistance element which provides a constant current in the case of changes in the supply line voltage. Any voltage changes in the input line voltage produce an increase in resistance so that the current remains the same. At the same time the phase of the output voltage is caused to lag behind the phase of the input voltage, or stated otherwise, the increased input voltage retards the phase angle of the output voltage. The new circuit provides an effective resistance over a very wide range of frequencies. This makes the resultant device particularly flexible or adaptable. A range of the phase shifting circuit has produced effective phase shifting results through a frequency ratio ranging from 1 to 20.

Another advantage of the present invention is found in the automatic disabling of the system if the D.C. control signal is lost. The SCR is immediately cut off and not left on after triggering. A further advantage is the speed of the response to the control in microseconds as compared to milliseconds in previous devices. Therefore, this system responds much faster. In addition, a few hundred microwatts of the D.C. signal can control the SCR from 98% of full power capacity down.

The embodiment of FIGURE 5 provides a system which will fire large SCR's and control their conduction angle over a wide range. A gate current requirement of 150 milliamps or greater can be met by this arrangement. As mentioned above, the produced pulse may have a wide rectangular or square-wave nature.

It will be understood that the described embodiments illustrate the adaptability of this invention. Such variation is shown in the use of a P–N–P transistor in the embodiment of FIGURE 3 wherein the base lead must be made negative with respect to the emitter lead in order for the transistor to conduct. Similarly, a germanium or a silicon transistor may be used in all cases.

The circuits described in the foregoing embody principles which are new in the construction of control systems. Those principles make possible a simplified phase shifting network. The features of this invention which are believed to be new are set forth in the accompanying claims.

What is claimed is:

1. An electrical apparatus including in combination a phase shifting means for producing an output voltage variable in phase relationship to an applied alternating voltage and connectible to a controlled rectifier for applying a firing signal to the rectifier, said phase shifting means including a first branch circuit consisting of a pair of impedances and a second branch circuit including a capacitor and a transistor serially connected across a portion of said second branch circuit, a D.C. signal means for varying the relative conductance of said transistor for an output terminal of said phase shifting means connected between said capacitor and transistor, a first unidirectional current means controlling the charging of said capacitor, a second means for providing a unidirectional current, the emitter and collector of a pair of second transistors coupled to said second unidirectional means, a pair of controlled rectifiers, means connecting said emitter and collector of each of said second transistors to the gate and cathode respectively of said controlled rectifiers for applying a firing signal to the rectifier, means coupling said phase shifting means to the base and emitter of said second transistor whereby the time of application of the firing signal to the controlled rectifier may be varied with respect to the initial application of the respective half cycles of said alternating voltage to the respective controlled rectifiers, and means for producing a negative transistor base-to-emitter bias producing a cut-off condition during the negative half of the rectifier anode voltage on the respective controlled rectifier.

2. An electrical apparatus including in combination a phase shifting means for producing an output voltage variable in phase relationship to an applied alternating voltage and connectible to a controlled rectifier for applying a firing signal to said rectifier, said phase shifting means including first branch circuit consisting of a pair of impedances and a second branch circuit including a capacitor and a transistor serially connected across a portion of said second branch circuit, a D.C. signal means for varying the relative conductance of said transistor, a first unidirectional current means controlling the charging of said capacitor, a second means for providing a unidirectional current, the emitter and collector of a second transistor coupled to said second unidirectional current means, a controlled rectifier, means connecting said emitter and collector to the gate and cathode of said controlled rectifier for applying a firing signal to the rectifier, and means coupling said phase shifting means to the base and emitter of said second transistor whereby the time of application of the firing signal may be varied with respect to the initial application of the positive half cycle of said alternating voltage to the controlled recifier.

References Cited by the Examiner

UNITED STATES PATENTS

| | | | |
|---|---|---|---|
| 2,414,475 | 1/1947 | Marchand | 328—155 |
| 3,075,136 | 1/1963 | Jones | 307—88.5 |
| 3,095,513 | 6/1963 | Lezan | 323—119 |
| 3,177,375 | 4/1965 | Hakimoglu et al. | 307—88.5 |
| 3,192,466 | 6/1965 | Sylvan et al. | 307—88.5 |

ARTHUR GAUSS, *Primary Examiner.*

B. P. DAVIS, *Assistant Examiner.*